US010389844B2

(12) United States Patent
Bastide et al.

(10) Patent No.: US 10,389,844 B2
(45) Date of Patent: Aug. 20, 2019

(54) POPULATING A USER NETWORK FOR A FOCUS USER

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US); Dale M. Schultz, Limerick, ME (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 318 days.

(21) Appl. No.: 14/628,949

(22) Filed: Feb. 23, 2015

(65) Prior Publication Data

US 2016/0248880 A1 Aug. 25, 2016

(51) Int. Cl.
*G06F 15/16* (2006.01)
*H04L 29/08* (2006.01)
*G06Q 50/00* (2012.01)

(52) U.S. Cl.
CPC ........... *H04L 67/306* (2013.01); *G06Q 50/01* (2013.01); *H04L 67/22* (2013.01)

(58) Field of Classification Search
CPC .............................. H04L 67/306; H04L 67/22
USPC ................ 709/201, 204, 208, 217, 220, 223
See application file for complete search history.

(56) References Cited

U.S. PATENT DOCUMENTS

| 8,510,380 | B2 | 8/2013 | Faller et al. |
| 2004/0122693 | A1 | 6/2004 | Hatscher et al. |
| 2009/0235335 | A1* | 9/2009 | Mendiola ............. H04L 63/104 726/4 |
| 2009/0265106 | A1* | 10/2009 | Bearman ................ G06Q 10/00 701/300 |
| 2011/0126132 | A1 | 5/2011 | Anderson et al. |
| 2011/0246574 | A1* | 10/2011 | Lento .................... G06Q 10/10 709/204 |

(Continued)

FOREIGN PATENT DOCUMENTS

| WO | 2005074445 A2 | 8/2005 |
| WO | 2011046899 A1 | 4/2011 |

(Continued)

OTHER PUBLICATIONS

List of IBM Patents or Patent Applications Treated as Related; May 26, 2015.

(Continued)

*Primary Examiner* — Chirag R Patel
*Assistant Examiner* — Marshall M McLeod
(74) *Attorney, Agent, or Firm* — Fabian VanCott; Steven L. Nichols (57) ABSTRACT

Populating a user network for a focus user includes identifying a base network in a social network, the base network includes a group of users that are potential social connections for a focus user, receiving a policy associated with the focus user, the policy includes information for populating, from the base network, a user network associated with the focus user, determining, based on the policy, a number of proposed social connections from the base network to populate the user network, and populating the user network of the focus user with the number of proposed social connections.

16 Claims, 5 Drawing Sheets

(56) References Cited

U.S. PATENT DOCUMENTS

| | | | |
|---|---|---|---|
| 2011/0307553 A1 | 12/2011 | Ghang et al. | |
| 2012/0110096 A1* | 5/2012 | Smarr | G06Q 10/10 709/206 |
| 2013/0031194 A1* | 1/2013 | Bosworth | H04L 67/22 709/206 |
| 2013/0103758 A1* | 4/2013 | Alison | G06Q 50/01 709/204 |
| 2013/0290414 A1 | 10/2013 | Rait et al. | |
| 2013/0297699 A1 | 11/2013 | Yoshida et al. | |
| 2014/0019555 A1 | 1/2014 | Cai et al. | |
| 2015/0046539 A1* | 2/2015 | Shah | G06Q 10/107 709/204 |
| 2016/0253710 A1* | 9/2016 | Publicover | G06Q 30/02 705/14.66 |

FOREIGN PATENT DOCUMENTS

| | | |
|---|---|---|
| WO | 2011076530 | 6/2011 |
| WO | 2013105115 | 7/2013 |

OTHER PUBLICATIONS

IBM; SPSS Text Analytics for Surveys; pp. 1-2; May 2015; http://www-01.ibm.com/software/analytics/spss/products/statistics/text-analytics-for-surveys/.

IBM; SPSS Statistics; pp. 1-2; May 2015; http://www-01.ibm.com/software/analytics/spss/products/statistics/.

Wikipedia, the free encyclopedia; Natural Language Processing; pp. 1-10; May 2015; http://en.wikipedia.org/wiki/Natural_language_processing.

\* cited by examiner

POPULATING A USER NETWORK FOR A FOCUS USER

BACKGROUND

The present invention relates to populating a social network, and more specifically, populating a user network for a focus user.

A social network is a network based application to enable a user to create a user account. Once the user account is created, the user establishes social connections with other users, such as friends, family, and colleagues in an online environment. Further, once the user is connected with other users, the user may share information, in the form of messages, with each of the other users on the social network system by uploading pictures, updating personal information, updating status information, commenting on other user's information, among other activities.

BRIEF SUMMARY

A computer implemented method to populate a user network for a focus user includes identifying a base network in a social network, the base network includes a group of users that are potential social connections for a focus user, receiving a policy associated with the focus user, the policy includes information for populating, from the base network, a user network associated with the focus user, determining, based on the policy, a number of proposed social connections from the base network to populate the user network, and populating the user network of the focus user with the number of potential social connections.

A social network populating system for populating a user network for a focus user includes at least one social network server associated with a focus user that manages a user network of the focus user, the social network server includes a processor, memory communicatively connected to the processor, and a user network populating system, including an identifying module to identify a base network in a social network, the base network includes a group of users that are potential social connections for a focus user, a receiving module to receive a policy associated with the focus user, the policy includes information for populating, from the base network, a user network associated with the focus user, a determining module, to determine, based on the policy, a number of proposed social connections from the base network to populate the user network, a populating module, to populate the user network of the focus user with the number of proposed social connections, and a monitoring module, to monitor the policy to provide feedback on the effectiveness of the policy.

A computer program product includes a computer readable storage medium, the computer readable storage medium having computer readable program code embodied therewith. The computer readable program code, when executed by a processor, identifies a base network in a social network, the base network includes a group of users that are potential social network connections for a focus user, receive a policy associated with the focus user, the policy includes information for populating, from the base network, a user network associated with the focus user, determine, based on the policy, a number of proposed social connections from the base network to populate the user network, populate the user network of the focus user with the number of potential social network connections, and monitor the policy to provide feedback on the effectiveness of the policy.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for populating a user network for a focus user, such that the user network is populated with proposed social connections from a base network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus, to produce a machine such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or blocks or block diagram.

The computer readable program instructions may also be loaded onto a computer, other programmable data processing apparatus, or other device to cause a series of operational steps to be performed on the computer, other programmable apparatus or other device, to produce a computer implemented process such that the instructions which execute on the computer, other programmable apparatus, or other device, implement the functions/acts specified in the flowchart and/or block diagram block or blocks.

The flowchart and block diagrams in the Figures illustrate the architecture, functionality, and operation of possible implementations of systems, methods, and computer program products, according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or carry out combinations of special purpose hardware and computer instructions.

As noted above, a social network is a network based application to enable a user to create a user account and share information with other users. To facilitate effective communication, users benefit from creating a user network populated with users from the social network who are capable of providing relevant information and have common interests. A user of the social network manually populates their user network to facilitate this effective communication. As a result, the user creates social connections with other users to gain access to knowledge and resources in the form of questions and answers.

Often, a user attempts to manually establish a number of social connections for their user network. However, the user may not recognize which of the other users are effective social connections. As a result, the user network may be populated with ineffective social connections. A user network populated with ineffective social connections may result in the user having difficulty obtaining information in the form of questions and answers. Further, the user may be isolated from making appropriate decisions. This leads to low productivity in solving problems. Further, a user that populates their user network with poor social connections may appear to be effective, but the user is still isolated from important decision making. Still further, a user that has a number of ineffective social connections that lack common interest may receive incorrect information. This decreases the probability that the user notices the correct answer when a number of social connections answer the user's question on the social network. As a result, the user may spend time attempting to manually develop their user network. This results in a burdensome task for the user.

The principles described herein include a system and a method for populating a user network for a focus user. The system and method includes identifying a base network in a social network, the base network includes a group of users that are potential social connections for a focus user, receiving a policy associated with the focus user, the policy includes information for populating, from the base network, a user network associated with the focus user, determining, based on the policy, a number of proposed social connections from the base network to populate the user network, and populating the user network of the focus user with the number of proposed social connections. Such a method allows a user network to be populated according to a policy, the policy including knowledge the user may not possess. As a result, the focus user establishes a number of effective social connections for their user network that enhances productivity and social acceptance.

As used in the present specification and in the appended claims, the term "user" means a data structure representing a user's participation in a social network. A user may include attributes describing the user. The attributes may include interests, skill set, job or position, or other information to describe the user.

As used in the present specification and in the appended claims, the term "focus user" means a specific user in a social network that is associated with a user network. The focus user may be one user or a group of users in the social network.

As used in the present specification and in the appended claims, the term "social network" means a network based application to enable a user to creates a user account, establish social connections, and share information. A social network may include a number of base networks, a number of user networks, or combination thereof.

As used in the present specification and in the appended claims, the term "base network" means a group of users in a social network that may become social connections for a focus user. The base network may include a number of subgroups.

As used in the present specification and in the appended claims, the term "group" or "group of users" means a number of users in a network that share a common trait such as an attribute. A group of users may be identified by a common attribute. A group of users may belong to a membership list that identifies the group. A group of users may be a number of users that are socially connected to each other.

As used in the present specification and in the appended claims, the term "subgroup" means a grouping of a group of users, from a base network, into categories based on attributes. A subgroup allows a user network populating system to group users together based on common attributes. A subgroup includes a number of users that share an attribute that is not present in other users in a base network.

As used in the present specification and in the appended claims, the term "social connection" means an established relationship between at least two users on a social network. A social connection may be symmetric or asymmetric.

As used in the present specification and in the appended claims, the term "potential social connection" means a user that is identified to possibly become a social connection for a focus user. A number of the potential social connections may be selected to become proposed social connections.

As used in the present specification and in the appended claims, the term "proposed social connection" means a user that is proposed by a populating system to become a social connection of a focus user. The proposed social connection may be selected from potential social connections of a base network.

As used in the present specification and in the appended claims, the term "user network" means to a set of social connections associated with a focus user. A user network allows a focus user to communicate directly to other users in the user network.

As used in the present specification and in the appended claims, the term "social network server" means a computing device that manages a number of users with a number of social connections in a social network. A social network server includes a number of computers acting as a single computing system to manage the social network of a number of user networks associated with a number of users.

As used in the present specification and in the appended claims, the term "populate" means the process of creating social connections. A system may populate a user network by creating social connections for a focus user. A system may populate a user network by inviting a focus user to create a social connection.

As used in the present specification and in the appended claims, the term "policy" means information and rules related to the process of populating a user network. The policy informs a user network populating system as to which potential social connections are of benefit to the focus user to facilitate effective communication.

As used in the present specification and in the appended claims, the term "attributes" means a characteristic defining users of a subgroup. An attribute may include preferences and/or skills of users in a subgroup.

As used in the present specification and in the appended claims, the term "ordering attribute" means a mechanism to order rules associated with a policy. The rules may be executed in the order defined by the ordering attribute.

As used in the present specification and in the appended claims, the term "category" means a class or division of users that share an attribute. A group of users in a category may form a group or subgroup, defined by the sharing of the attribute.

As used in the present specification and in the appended claims, the term "numeric range" means a number of the potential social connection associated from a subgroup of the base network that the user network is to be populated with. A numeric range specifies a lower limit and an upper limit. A policy specifies that a user network is to have at least the number of social connections from a subgroup specified by the lower limit and a maximum number of social connections from the subgroup as specified by the upper limit.

As used in the present specification and in the appended claims, the term "percentage range" means a percentage of the user network that are associated with a subgroup of a base network that the user network is to be populated with. A percentage range specifies a lower percentage limit and an upper percentage limit. A policy specifies that a user network is to have at least a minimum percent of social connections from a subgroup as specified by the lower percentage limit and a maximum percent of social connections from the subgroup as specified by the upper percentage limit.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
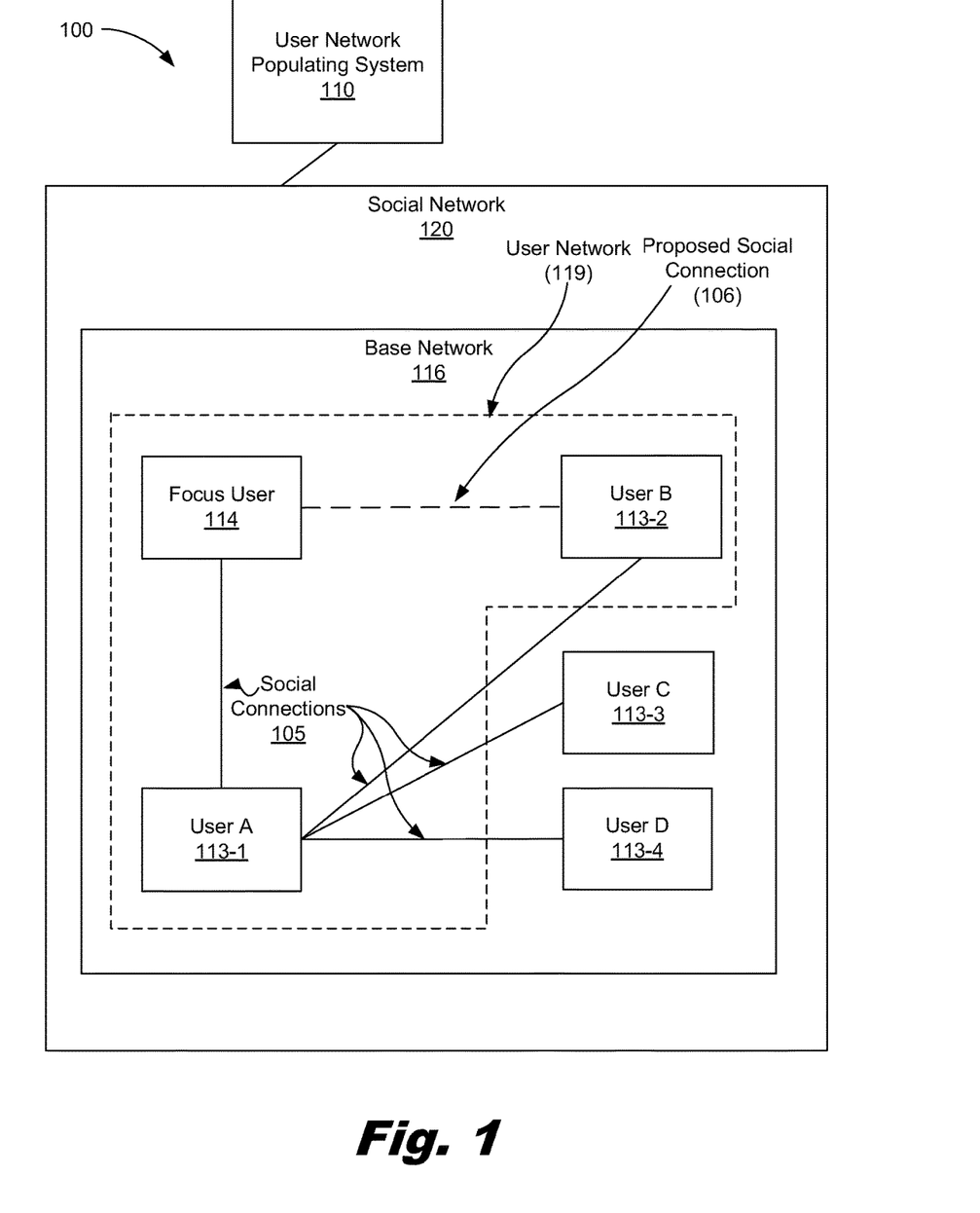
FIG. 1 is a diagram of a system for populating a user network for a focus user, according to one example of the principles described herein.

Referring now to the figures, FIG. 1 is a diagram of a system for populating a user network for a focus user, according to one example of the principles described herein. As will be described below, a focus user is a member of a social network. The focus user may be a new user of the social network, a user that has transitioned to a new role in the social network, or a user that is enhancing social connections.

Further, the focus user lacks effective social connections in the social network. Through enhancing the user network of the focus user, the focus user may function more effective in a role by being able to solicit or share information more effectively.

As illustrated in FIG. 1, the system (100) includes a social network (120). The social network (120) is a network based application to enable a user to creates a user account, establish social connections, and share information. The social network (120) includes a base network (116). The base network (116) includes a number of potential social connections for a focused user (114). As illustrated, the base network (116) includes the focus user (114), user A (113-1), user B (113-2), user C (113-3), and user D (113-4).

Further, each of the users (113, 114) has a number of social connections (105). The focus user (114) has a single social connection (105). The single social connection of the social connections (105) connects the focus user (114) with user A (113-1). As will be described below, the focus user (114) may benefit from additional social connections.

As illustrated in FIG. 1, the system (100) includes a user network populating system (110). The user network populating system (110) acts on the focus user (114) to populate a user network (119) for the focus user (114). As will be described in other parts of this specification, the user network populating system (110) expands the user network (119) of the focus user with social connections.

The user network populating system (110) may reside on a social network server. The user network populating system (110) may reside on a computing device operated by the focus user (114). The user network populating system (110) may reside on a computing device operated by other users in the social network (120). The user network populating system (110) may operate as an independent computing device in communication with a social network server.

The user network populating system (110) identifies a base network (116) in a social network (120), the base network (116) includes a group of users that are potential social connections for a focus user (114). The base network (116) serves as a base of users and may be considered as proposed social connections of the focus user (114).

Further, the user network populating system (110) receives a policy associated with the focus user (114), the policy includes information for populating, from the base network (116), a user network (119) associated with the focus user (114). The policy provides rules for populating the user network (119).

The user network populating system (110) determines, based on the policy, a number of proposed social connections (106) from the base network (116) to populate the user network. As illustrated, the user network populating system determines user B (113-2) is a proposed social connection (106) because user B (113-2) may facilitate effective communication such that the focus user (114) gains access to knowledge and resources in the form of questions and answers.

The user network populating system (110) populates the user network (119) of the focus user (114) with the number of proposed social connections (106). As illustrated, the proposed social connection (106) expands the user network (119) of the focus user (114) to include user B (113-2). As a result, the focus user establishes a number of effective social connections for their user network that enhances productivity and social acceptance.

Figure 2:
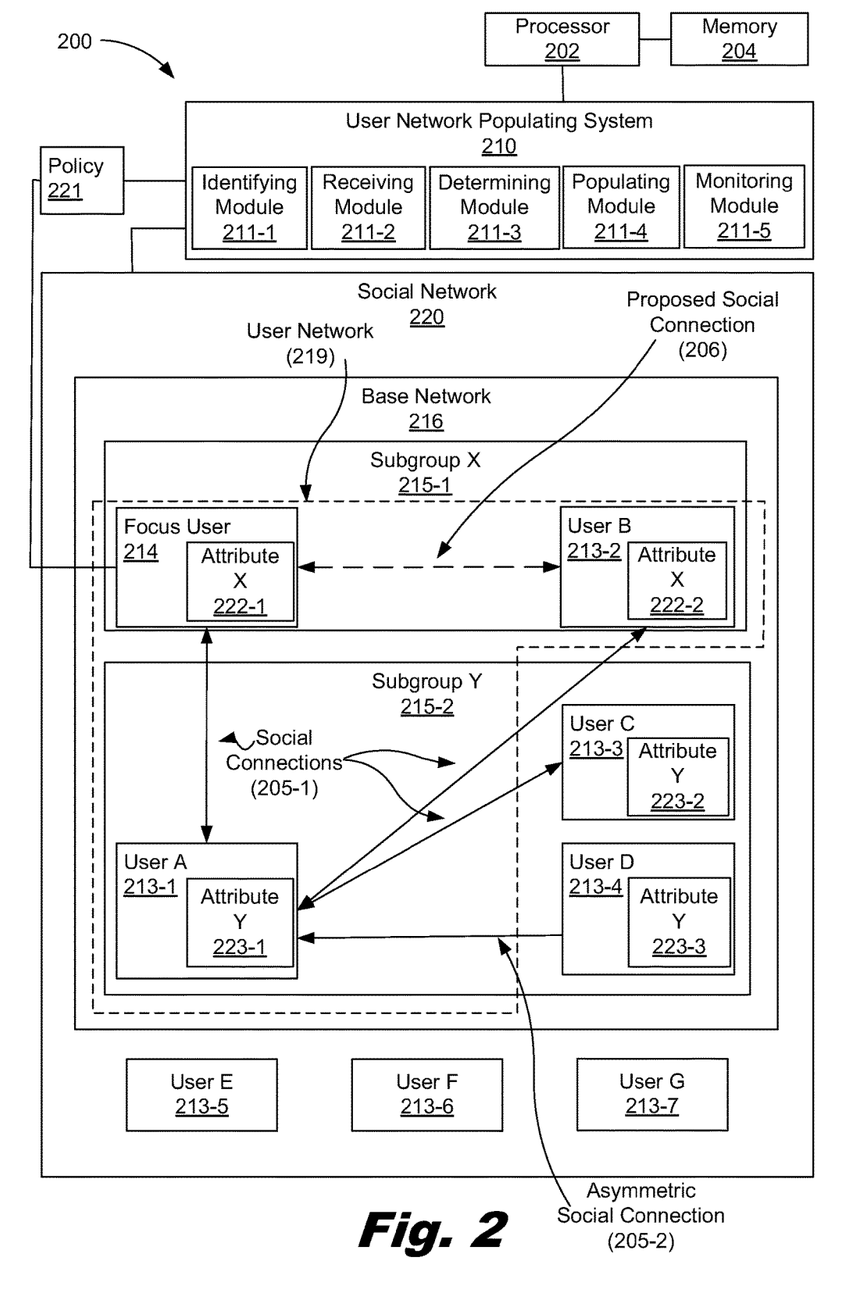
FIG. 2 is a diagram of a system for populating a user network for a focus user, according to one example of the principles described herein.

FIG. 2 is a diagram of a system for populating a user network for a focus user, according to one example of the principles described herein. As will be described below, a social network populating system includes a processor, memory communicatively connected to the processor, and a user network populating system. The user network populating system includes an identifying module to identify a base network in a social network, the base network includes a group of users that are potential social connections for a focus user. The user network populating system includes a receive module to receive a policy associated with the focus user, the policy includes information for populating, from the base network, a user network associated with the focus user. The user network populating system includes a determining module, to determine, based on the policy, a number of the proposed social connections from the base network to populate the user network. The user network populating system includes a populating module to populate the user network of the focus user with the number of proposed social connections. The user network populating system includes a monitoring module to monitor the policy to provide feedback on the effectiveness of the policy.

As illustrated, the system (200) includes a social network (220). The social network (220) is a network based application to enable a user to create a user account. Once the user account is created, the user establishes social connections with other users, such as friends, family, and colleagues in an online environment. Further, once the user is connected with other users, the user may share information, in the form of messages, with each of the other users on the social network system by uploading pictures, updating personal information, updating status information, commenting on other user's information, among other activities The social network (220) includes a base network (216). The base network (216) includes a number of subgroups (215). The subgroups (215) group users of the base network (216) into categories based on attributes. As illustrated, the subgroups (215) include subgroup X (215-1) and subgroup Y (215-2).

As illustrated, each of the subgroups (215) includes a number of users (213-1, 213-2, 213-3, 213-4, 214). As will be described below, each of the users in the subgroups (215) includes at least one common attribute. A focus user (214) and user B (213-3) are in subgroup X (215-1). User A (213-1), user C (213-3), and user D (213-4) are in subgroup Y (213-3). Further, user E (213-5), user F (213-6), and user G (213-7) are not in the base network (216). As a result, users 213-5, 213-6, and 213-7 are excluded from the base network (216) and may not considered as potential social connections for the focus user (214).

As mentioned above, each of the users in the subgroups (215) includes at least one common attribute. An attribute (222, 223) may include a personal interest, a skill, a membership in an organization, or a job role. In one example, attribute X (222) represents a job role, such as an engineer. Subgroup X (215-1) may group all users that have attribute X (222). Since the focus user (214) and user B (213-2) have attribute X (222-1), the focus user (214) and user B (213-2) are grouped in subgroup X (215-1). Attribute Y (223) represents a job role in sales. Since user A (213-1), user C (213-3), and user D (213-4) have attribute Y (223-1), user A (213-1), user C (213-3), and user D (213-4) are in subgroup Y (215-2).

As illustrated, the users (213, 214) have established a number of social connections (205, 207). The social connections (205) may be symmetric or asymmetric. A symmetric relationship may be established by a user issuing a request to establish the relationship, and the recipient accepting the relationship. This creates social connections (205-1). Once a social connection is established, the users may view each other's information on the social network. The information may include status updates, personal information changes, job changes, pictures, or shared information. An asymmetric relationship may be established by requesting that information be received from another user. This creates an asymmetric social connection (205-2). In an asymmetric relationship a first user receives updates from a second user, but a second user may not see updates from the first user. Further, a proposed social connection (206) indicates a relationship proposed by the user network populating system (210). As illustrated, the focus user (214) has a social connection (205) with user A (213-1). User A (213-1) has social connections (205) with user B (213-2) and user C (213-3). User D (213-4) has an asymmetric social connection with user A (123-1).

As illustrated in FIG. 2, the system (200) includes a user network populating system (210). The user network populating system (210) may be located on a social networking server. As illustrated, the user network populating system (210) includes an identifying module (211-1), a receiving module (211-2), a determining module (211-3), a populating module (211-4), and a monitoring module (211-5). The modules (211) may be implemented in hardware. The modules (211) may be implemented as a combination of hardware and program instructions to perform the designated purpose. The modules (211) refer to computer program instructions for performing a designated function. The modules (211) may execute on a single processor (202) or on a number of processors. The computer program code causes of the modules (211) cause the processor (202) to execute the designated function of the module (211). The processor (202) is communicatively connected to memory (204). The memory (204) may provide volatile storage for the computer program code of the modules (211).

Further, the user network populating system (210) may reside on a social network server. The user network populating system (210) may reside on a computing device operated by the focus user (214). The user network populating system (210) may reside on a computing device operated by a different user (213) in the social network. The user network populating system (210) may operate as an independent computing device in communication with a social network server.

As illustrated, the user network populating system (210) includes the identifying module (211-1) to identify a base network (216) in a social network (220). The base network (216) includes the focus user (214), user A (213-1), user B (213-2), user C (213-3) and user D (213-4). The base network (216) may be identified using the existing social connections (205) of the focus user (214). As illustrated, the base network (216) includes users (213-2, 213-3, 213-4) that have a social connection with user A (213-1). Further, user A (213-1) has a social connection (205) with the focus user (214).

The user network populating system (210) includes the receiving module (211-2) to receive a policy (221) associated with the focus user (214), the policy includes information for populating, from the base network (216), a user network (219) associated with the focus user (214). The policy (221) may include a percentage range, the percentage range representing a percentage of the user network (219) that is associated with a subgroup (215) of the base network (216) that the user network (219) is to be populated with. In one example, the policy (221) may inform the user network populating system (210) that the user network (219) is to have between twenty-five and seventy-five percent of the users from subgroup Y (215-2).

The policy (221) may indicate a numeric range, the numeric range representing a number of the potential social connection associated with a subgroup of the base network (216) that the user network (219) is to be populated with. The policy (221) may specify a numeric rage of proposed social connections to be selected from a subgroup (215). In one example, the policy (221) may specify that between one and three proposed social connections are to be users of subgroup X (215-1).

The policy (221) may include a number of rules for populating the user network of the focus user (214). The number of rules for populating the user network (219) of the focus user (214) may include at least one ordering attribute. The ordering attribute determines what order the rules are to be applied. For example, rule X's ordering attribute may specify rule X is applied before rule Y. Each of the number of rules for populating the user network (219) of the focus user (214) may include a time, the time representing a duration when each of the number of rules is valid. In one example, a rule may be specified to be valid for a six month time period.

As a result, after the six month time period, the rule will no longer be applied. Further, after the six month time period, the rule may be deleted from the policy (221).

The user network populating system (210) includes the determining module (211-3) to determine, based on the policy (221), a number of proposed social connections (206) from the base network (216) to populate the user network (219). The user network populating system (210) determines that the focus user (214) is to have more social network connections (205) with users in subgroup X (215-1) than users in subgroup Y (215-2). As illustrated, user B (213-2) belongs to subgroup X (215-1) and is determined to be a proposed social connection (206) of the focus user (214). User C (213-3) and user D (213-4) are users of subgroup B (215-2). The lack of common group membership between focus user (214) and users C (213-3) and D (213-4) cause user C (213-3) and user D (213-4) not to be determined to be proposed connections of the focus user (214). User A (213-1) belongs to subgroup B (215-2). The focus user (214) and social connection (205) user A (113-1) belonging to different groups may reduce the effectiveness of user A (213-1) in communicating with the social network (220). The user network populating system (210) determines that the user network of the focus user (214) is to include user B (213-2) due to user B (213-2) belonging to the same subgroup, subgroup X (215-2), as the focus user (214)

The user network populating system (210) includes the populating engine, to populate the user network (219) of the focus user (214) with the number of proposed social connections (206). The user network populating system (210) establishes a proposed social connection (206) between the focus user (214) and user B (213-2), based on the policy. The user network populating system (210) acts on the focus user (214) and proposes a proposed social connection, user B (213-2). The proposed social connection (206) is added to the user network (219) of the focus user (214). As illustrated, the user network (219) of the focus user (214) includes user A (213-1) and user B (213-2).

The user network populating system (210) may include the monitoring module (211-5). The monitoring module (211-5) monitors the policy (221) to provide feedback on the effectiveness of the policy (221). The monitoring module (211-5) may include measuring how many proposed social connections (206) are identified for a user. The monitoring module (211-5) may monitor continued application of the policy (221) in the identifying module (211-1) a base network (216), the receiving module (211-2) the policy (221), the determining module (211-3) proposed social connections (206), and the populating module (211-4) a user network (219), or combinations thereof. The monitoring module (211-5) may monitor the user network (219) for effectiveness of activity for the focus user (214). Activities may include, for example, which parts of a policy (221) are contributing to the proposal of social connections, an indication of the number of contacts a user establishes based on the policy (221), and information related to which contacts provide information to a user. The monitoring module (211-5) monitors attributes of the policy (221) and the interactions of the policy (221) with the user network (219) associated with the focus user (214).

An overall example of FIG. 2 will now be described. In one example, the focus user (213) is a member of the social network (220). The user network populating system (210) identifies a base network (216) in the social network (220) via the identifying module (211-1). The base network (216) is identified using the social connections (205) of the focus user (214).

The user network populating system (210) receives, via a receiving module (211-2), a policy (221) associated with the focus user (214). The policy (221) informs the user network populating system (210) of information for populating the user network (219) of the focus user (214). The policy (221) indicates that the focus user (214) is to have more social connections (205) from subgroup X (215-1).

The user network populating system (210) determines, via a determining module (211-3), which users (213) are proposed social connections (206) of the focus user (214). User B (213-2) is determined to be in the same subgroup (215-1) as the focus user (214). As a result, user B (213-2) is determined to be a proposed social connection (206) of the focus user (214).

The user network populating system (210) populates (211-4) the user network for the focus user (214) by assigning the proposed social connection (206). As a result, user B (213-2) becomes a social connection in the user network (219).

Figure 3:
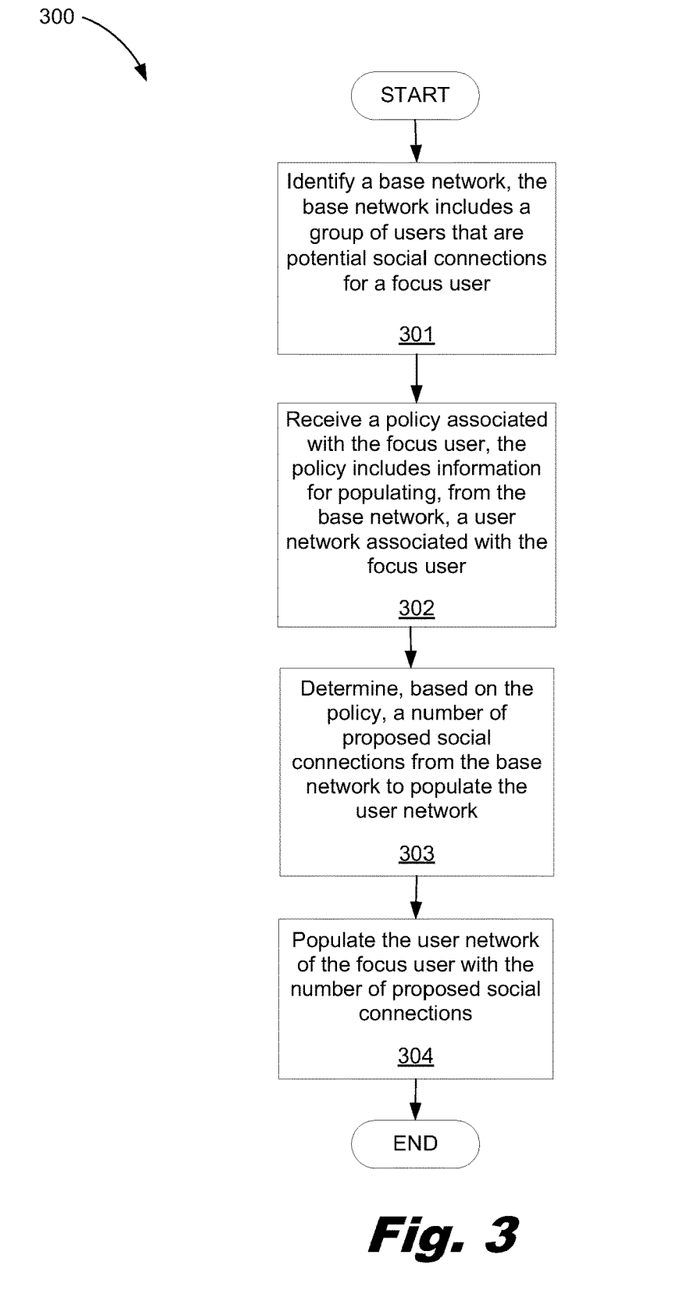
FIG. 3 is a flowchart of a method for populating a user network for a focus user, according to one example of the principles described herein.

FIG. 3 is a flowchart of a method for populating a user network for a focus user, according to one example of the principles described herein. The method (300) may be executed by the user network populating system (110) of FIG. 1. The method (300) may be executed by other systems (i.e. system 200, system 500, or system 600). In this example, the user network populating method (300) includes identifying (301) a base network in a social network, the base network includes a group of users that are potential social connections for a focus user, receiving (302) a policy associated with the focus user, the policy includes information for populating, from the base network, a user network associated with the focus user, determining (303), based on the policy, a number of the proposed social connections from the base network to populate the user network, and populating (304) the user network of the focus user with the number of proposed social connections.

As mentioned above, the method (300) includes identifying (301) a base network, the base network includes a group of users that are potential social connections for a user. The base network forms a set of potential social connections the method (300) operates on to populate the user network of the focus user. The identifying (301) may identify the base network based on extended social connections of the focus user. In one example, the base network may include the social connections of the focus user. The identifying (301) may receive a number of identified users that are to be a part of the base network. In another example, the base network may include employees of a company that work in an organization. The base network may include a number of subgroups, each of the subgroups grouping the group of users into categories based on attributes.

As mentioned above, the method (300) includes receiving (302) a policy associated with the focus user, the policy includes information for populating, from the base network, a user network associated with the focus user. The policy specifies attributes that the user network of the focus user is to include after the user network has been populated. The policy may include a percentage range. The percentage range represents a percentage of the user network that is associated with a subgroup of the base network of the user network. The policy may include a numeric range. The numeric range represents a number of the potential social connections associated with a subgroup of the base network that the user network is to be populated with. The policy may include a number of rules for populating the user network of the focus user. Each of the number of rules for populating the user network of the focus user may include at least one ordering attribute. Each of the number of rules for populating the user network of the focus user may include a time, the time representing a duration when each of the number of rules is valid. In one example, a rule may have a time attribute that indicates the rule is to be applied for the first thirty days of operation on the focus user. Thereafter, the rule is no longer applied to the focus user.

As mentioned above, the method (300) includes determining (303), based on the policy, a number of proposed social connections from the base network, to populate the user network. The method determines (303), from the base network, which users are determined to be proposed as social connections based on attributes the users. For example, the method (300) determines that a user is to be a proposed social connection based on the user role, user expertise, or user skills.

As mentioned above, the method (300) includes populating (304) the user network of the focus user with the number of proposed social connections. The populating (304) may assign a proposed social connection to be a social connection to populate the user network of the focus user. The populating (304) may query the focus user to confirm that the focus user accepts the proposed social connection as a social connection.

Figure 4:
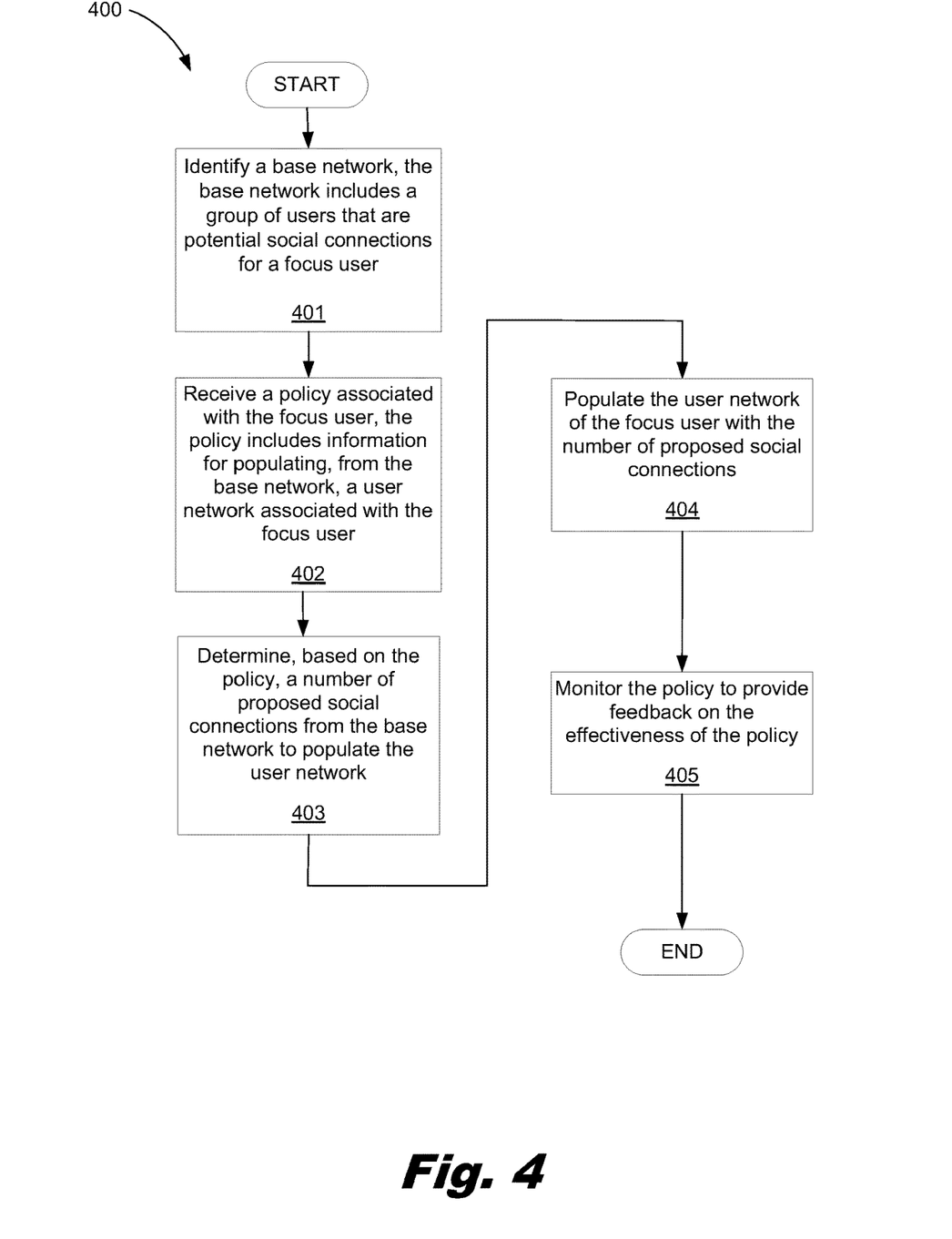
FIG. 4 is a flowchart of a method for populating a user network for a focus user, according to one example of the principles described herein.

FIG. 4 is a flowchart of an example of a method for populating a user network for a focus user, according to one example of the principles described herein. The method (400) may be executed by the user network populating system (110) of FIG. 1. The method (400) may be executed by other systems (i.e. system 200, system 500, or system 600). In this example, the method (400) includes identifying (401) a base network, the base network includes a group of users that are potential social connections for a focus user, receiving (402) a policy associated with the focus user, the policy comprising information for populating, from the base network, a user network associated with the focus user, determining (403), based on the policy, a number of proposed social connections from the base network to populate the user network, populating (404) the user network of the focus user with the number of proposed social connections, and monitoring (405) the policy to provide feedback on the usage of the policy.

As illustrated, the method (400) includes monitoring (405) the policy to provide feedback on the usage of the policy. Monitoring (405) the policy may include measuring how many social connections are added to the user network of the focus user. Monitoring (405) the policy may include tracking the number of social connections that are added to the user network of the focus user over a period of time. Monitoring (405) may monitor social traffic in the user network to determine when the social connections are being used. The monitoring (405) monitors attributes of the policy and the interactions of the policy with the user network associated with the focus user.

Figure 5:
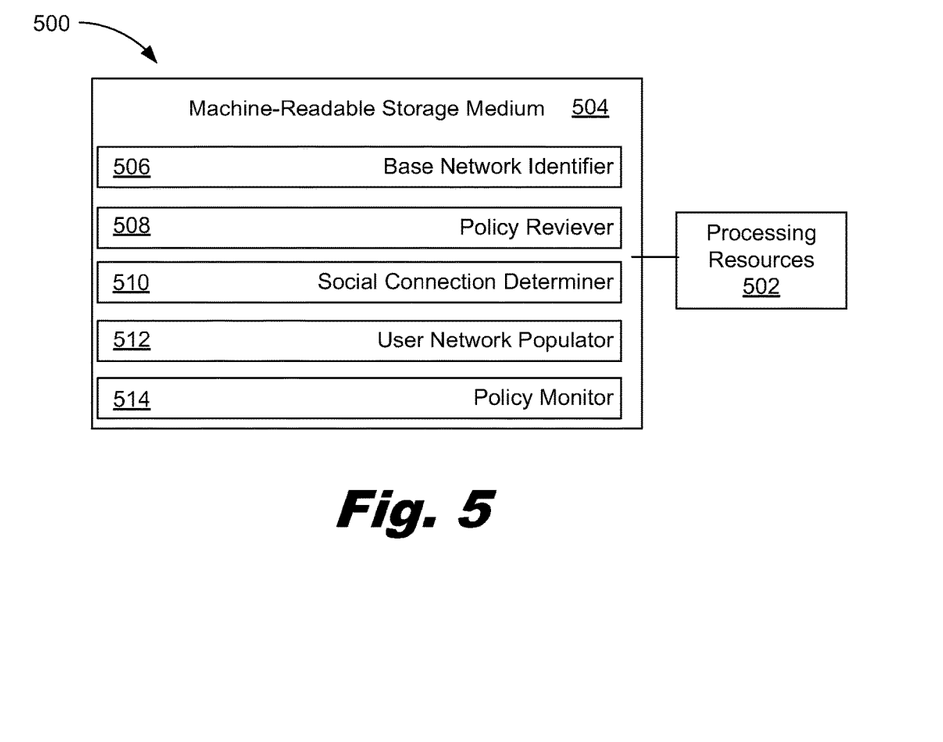
FIG. 5 is a diagram of a user network populating system, according to one example of the principles described herein.

FIG. 5 is a diagram of an example of a user network populating system, according to one example of the principles described herein. In this example, the user network populating system (500) includes a processing resource (502) that is in communication with a machine-readable storage medium (504). The processing resource (502) includes at least one processor and other resources used to process instructions. The machine-readable storage medium (504) generally represents any memory capable of storing data, such as programmed instructions, or data structures used by the user network populating system (500). The instructions shown stored in the machine-readable storage medium (504) include a base network identifier (506), a policy receiver (508), a social connection determiner (510), a user network populator (512), and a policy monitor (514).

The machine-readable storage medium (504) contains computer readable program code to cause tasks to be executed by the processing resources (502). The machine-readable storage medium (504) may be a tangible and/or physical storage medium. The machine-readable storage medium (504) may be any appropriate storage medium that is not a transmission storage medium. A non-exhaustive list of machine-readable storage medium types includes non-volatile memory, volatile memory, random access memory, write only memory, flash memory, electrically erasable program read only memory, other types of memory, or combinations thereof.

The base network identifier (506) represents instructions that, when executed, cause the processing resource (502) to identify a base network in a social network, the base network includes a group of users that are potential social connections for a focus user. The policy receiver (508) represents instructions that, when executed, cause the processing resource (502) to receive a policy associated with a focus user, the policy includes information for populating, from the base network, a user network associated with the focus user.

The social connection determiner (510) represents instructions that, when executed, cause the processing resource (502) to determine, based on the policy, a number of proposed social connections from the base network to populate the user network. The user network populator (512) represents instructions that, when executed, cause the processing resource (502) to populate the user network of the focus user with the number of proposed social connections. The policy monitor (514) represents instructions that, when executed, cause the processing resource (502) to monitor the policy to provide feedback on the effectiveness of the policy.

Further, the machine-readable storage medium (504) may be part of an installation package. In response to installing the installation package, the instructions of the machine-readable storage medium (504) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (502) and the machine-readable storage medium (504) are located within the same physical component, such as a server, or a network component. The machine-readable storage medium (504) may be part of the physical component's main memory, caches, registers, non-volatile memory, or elsewhere in the physical component's memory hierarchy. Alternatively, the machine-readable storage medium (504) may be in communication with the processing resources (502) over a network. Further, the data structures, such as the libraries, may be accessed from a remote location over a network connection while the programmed instructions are located locally. Thus, the user network populating system (500) may be implemented on a user device, on a server, on a collection of servers, or combinations thereof.

The user network populating system (500) of FIG. 5 may be part of a general purpose computer. However, in alternative examples, the user network populating system (500) is part of an application specific integrated circuit.

Figure 6:
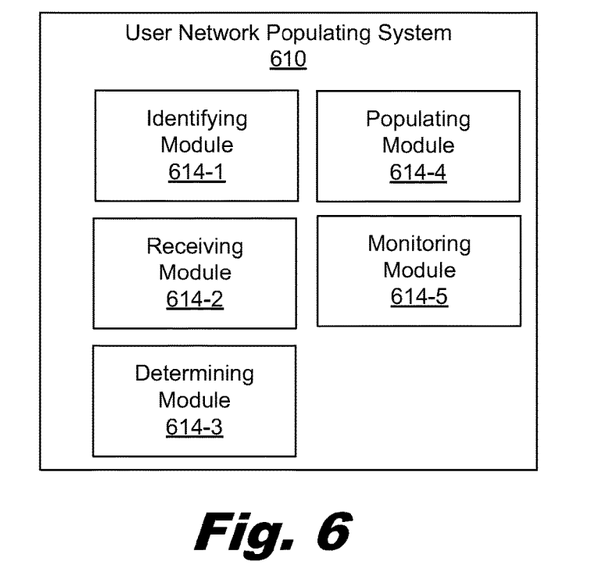
FIG. 6 is a diagram of a user network populating system, according to one example of the principles described herein.

FIG. 6 is a diagram of a user network populating system (610), according to one example of the principles described herein. The user network populating system (610) includes an identifying module (614-1), a receiving module (614-2), a determining module (614-3), a populating module (614-4), and a monitoring module (614-5). The modules (614) refer to a combination of hardware and program instructions to perform a designated function. Alternatively, the modules (614) may be implemented in the form of electronic circuitry (e.g., hardware). Each of the modules (614) may include a processor and memory. Alternatively, one processor may execute the designated function of each of the modules (614). The program instructions are stored in the memory and cause the processor to execute the designated function of the modules (614).

The identifying module (614-1) identifies a base network in a social network, the base network includes a group of users that are potential social connections for a focus user. The identifying module (614) may identify one base network in a social network. The identifying module (614) may identify several base networks in a social network.

The receiving module (614-2) receives a policy associated with the focus user, the policy includes information for populating, from the base network, a user network associated with the focus user. The receiving module (615) may receive one policy. The receiving module (615) may receive several policies.

The determining module (614-3) determines, based on the policy, a number of proposed social connections from the base network to populate the user network. The determining module (614-3) may determine, based on several policies, a number of proposed social connections from several base networks to populate the user network The populating module (614-4) populates the user network of the focus user with the number of proposed social connections. The populating module (614-4) may populate the user network based on factors such as an interval of time, the effectiveness of the user network, other factors, or combinations thereof.

The monitoring module (614-5) monitors the policy to provide feedback on the effectiveness of the policy. The monitoring module (614-5) may determine the policy is effective. The monitoring module (614-5) may determine the policy is ineffective.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special-purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicates otherwise. It will be further understood that the terms "comprises" and/or "comprising," when used in the specification, specify the presence of stated features, integers, operations, elements, and/or components, but do not preclude the presence or addition of a number of other features, integers, operations, elements, components, and/or groups thereof.

What is claimed is:

1. A computer implemented method to populate a user network for a focus user, the method comprising:
   identifying a base network in a social network, the base network comprising a group of users that are potential social connections for a focus user;
   receiving a policy associated with the focus user, the policy comprising information for populating, from the base network, a user network associated with the focus user;
   determining, based on the policy, a number of proposed social connections from the base network to populate the user network; and
   with a populating module implemented as electronic circuitry, populating the user network of the focus user with the number of proposed social connections via execution of rules by the populating module, wherein a first rule for populating the user network of the focus user comprises a time, the time representing a duration during which the first rule is valid, such that the first rule is not applied outside of the time specified;
   wherein the base network comprises a number of subgroups and wherein the policy comprises a percentage range, the percentage range representing a percentage of the user network that is associated with a subgroup of the base network that the user network is to be populated with.

2. The method of claim 1, wherein each of the subgroups comprise a group of users sharing at least one common attribute, wherein the common attribute is common to the focus user.

3. The method of claim 2, wherein the policy comprises a numeric range, the numeric range limiting a number of proposed social connections to be taken from each subgroup of the base network for inclusion in the user network.

4. The method of claim 1, wherein the policy comprises a plurality of rules that discriminate among the users of the base network to determine which users of the base network will be used in populating the user network of the focus user.

5. The method of claim 4, wherein the plurality of rules for populating the user network of the focus user comprise at least one ordering attribute that specifies in what order the rules are to be applied to discriminate among the users of the base network.

6. The method of claim 1, further comprising monitoring the policy to provide feedback on the effectiveness of the policy.

7. A social network populating system for populating a user network for a focus user, the system comprising:
   at least one social network server associated with a focus user, the social network server managing a user network of the focus user, the social network server comprising:
   a processor;
   memory, communicatively connected to the processor; and
   a user network populating system, the user network populating system comprising:
   an identifying module, to identify a base network in a social network, the base network comprising a group of users that are potential social connections for a focus user;
   a receiving module, to receive a policy associated with the focus user, the policy comprising information for populating, from the base network, a user network associated with the focus user;
   a determining module, to determine, based on the policy, a number of proposed social connections from the base network to populate the user network;
   a populating module implemented as electronic circuitry, to populate, via execution of rules by the populating module, the user network of the focus user with the number of proposed social connections, a first rule for populating the user network of the focus user comprising a time, the time representing a duration during which the first rule is valid, such that the first rule is not applied outside of the time specified; and
   a monitoring module, to monitor the policy to provide feedback on the effectiveness of the policy;
   wherein the base network comprises a number of subgroups and wherein the policy comprises a percentage range, the percentage range representing a percentage of the user network that is associated with a subgroup of the base network that the user network is to be populated with.

8. The system of claim 7, each of the subgroups comprise a group of users sharing at least one common attribute, wherein the common attribute is common to the focus user.

9. The system of claim 7, wherein the policy comprises a plurality of rules that discriminate among the users of the base network to determine which users of the base network will be used in populating the user network of the focus user.

10. The system of claim 8, wherein the policy comprises a numeric range, the numeric range indicating a number of proposed social connections to be taken from each subgroup of the base network for inclusion in the user network.

11. The system of claim 9, wherein the plurality rules for populating the user network of the focus user comprise an ordering attribute that specifies in what order the rules are to be applied to discriminate among the users of the base network.

12. A computer program product to populate a user network for a focus user comprises a non-transitory machine-readable storage medium encoded with instructions, the instructions executable by a processor of a system to cause the system to:
- identify a base network in a social network, the base network comprising a group of users that are potential social connections for a focus user;
- receive a policy associated with the focus user, the policy comprising rules to be applied to the group of users from the base network that determine which users from the group of users in the base network should be added to a user network associated with the focus user;
- determine, based on the policy, a number of proposed social connections from the base network to populate the user network according to the rules of the policy;
- populate, with a populating module implemented as electronic circuitry, the user network of the focus user with the number of proposed social connections via execution of rules by the populating module, wherein a first of the rules for populating the user network of the focus user comprises a time, the time representing a duration during which the first rule is valid, such that the first rule is not applied outside of the time specified; and
- monitor both a quantity of social connections added to the user network of the focus user and subsequent communications between the focus user and added social connections under the policy to provide feedback on the effectiveness of the policy;

wherein the base network comprises a number of subgroups and wherein the policy comprises a percentage range, the percentage range representing a percentage of the user network that is associated with a subgroup of the base network that the user network is to be populated with.

13. The computer program product of claim 12, wherein, each of the subgroups comprising a group of users sharing a common attribute, wherein the common attributes are all common to the focus user.

14. The computer program product of claim 12, wherein the policy comprises a plurality of rules that discriminate among the users of the base network to determine which users of the base network will be used in populating the user network of the focus user.

15. The computer program product of claim 14, wherein the rules for populating the user network of the focus user comprise at least one ordering attribute that specifies in what order the rules are to be applied to discriminate among the users of the base network.

16. The computer program product of 13, wherein the policy comprises a numeric range, the numeric range limiting a number of proposed social connections to be taken from each subgroup of the base network for inclusion in the user network.

* * * * *